United States Patent [19]

Schultz

[11] Patent Number: 4,691,599
[45] Date of Patent: Sep. 8, 1987

[54] LUG WRENCH EXTENSION HANDLE

[76] Inventor: Jerald Schultz, 354 Longacre Ave., Woodmere, N.Y. 11598

[21] Appl. No.: 816,066

[22] Filed: Jan. 3, 1986

[51] Int. Cl.$^4$ .............................................. B25G 1/04
[52] U.S. Cl. .................................... 81/177.2; 81/489; 7/100; 403/361; 403/383
[58] Field of Search ................. 81/177.1, 177.2, 427.5, 81/177.85, 489, 490; 16/111 R, 114 R, 115; 7/100, 167; 403/361, 109, 333, 334, 383; 29/273

[56] References Cited

U.S. PATENT DOCUMENTS

| | | | |
|---|---|---|---|
| D. 157,883 | 3/1950 | Maxwell | 81/177.1 |
| 916,613 | 3/1909 | Scruggs | 81/177.2 |
| 966,182 | 8/1910 | Erickson | 81/177.2 |
| 1,744,413 | 1/1930 | Peterson | 81/177.1 |
| 2,725,086 | 11/1955 | Keyes | 81/177.2 |
| 2,986,054 | 5/1961 | Lurie | 81/177.2 |
| 4,325,157 | 4/1982 | Balint | 16/115 |

*Primary Examiner*—Frederick R. Schmidt
*Assistant Examiner*—Bradley I. Vaught

[57] ABSTRACT

An extension handle for the standard automobile wheel lug nut wrench, consisting of a straight length of metal tube having a bore slightly larger than the diameter of the automobile lug wrench handle and having two indentations a short distance from one end, which are shaped to firmly grip the tapered end of the lug wrench.

1 Claim, 4 Drawing Figures

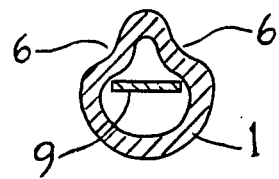
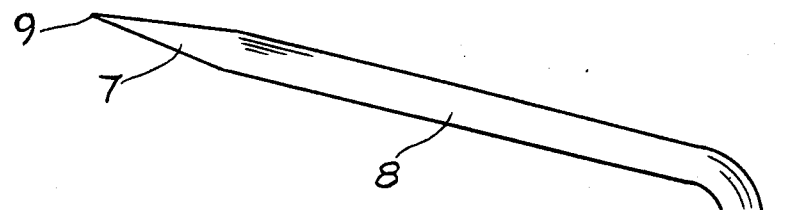
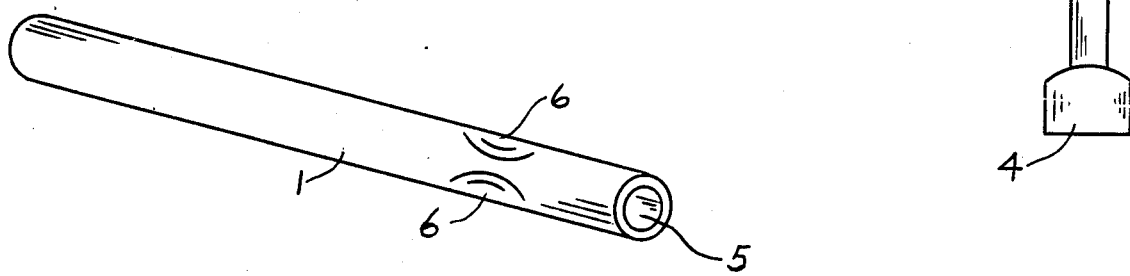
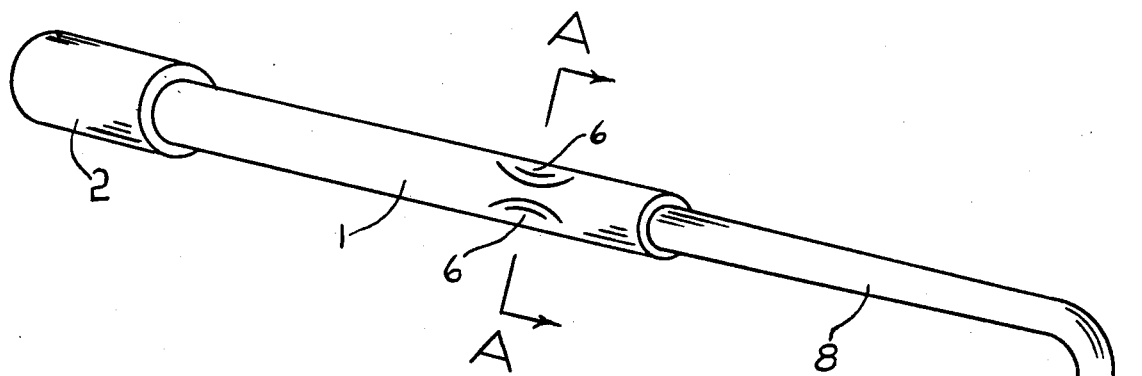
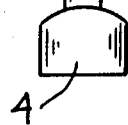

LUG WRENCH EXTENSION HANDLE

BACKGROUND OF THE INVENTION

A. Field of the Invention

The invention relates to an extension handle for easy attachment to an L shaped automobile lug wrench and subsequent easy detachment. The said lug wrench has a hexagonal socket on the short leg and a double tapered tip on the long leg. It is standard equipment on most new automobiles.

B. When the wheel lugs on an automobile are tightened with an impact wrench in a garage, the L shaped lug wrench requires a great deal of force to loosen the lugs or nuts. A strong person may be able to successfully manipulate the wrench, but a weak person may not be able to. With the extension handle attached to the lug wrench almost anyone can loosen the lugs.

Desireable features on an extension handle are structures for securely gripping the lug wrench to prevent any relative movement between the handle and the wrench, while permitting easy attachment and detachment of the handle to the wrench. This feature is important because the sharp end of the lug wrench has to be used to pry the hub cap off the wheel.

SUMMARY OF THE INVENTION

The invention is an extension handle for the lug wrench which is usually original equipment on automobiles made in the United States of America.

The main object of the invention is to greatly facilitate the task of loosening and removing automobile wheel lug nuts, and also facilitate the task of tightening said lug nuts.

Another object of the invention is to provide an extension handle which can be easily and quickly attached to an automobile wheel lug wrench and easily and quickly removed from the wrench.

A further object fo the invention is to provide an extension handle for the standard L shaped automobile lug wrench which will substantially increase the leverage available for loosening and or tightening automobile wheel lug nuts.

Another object of the invention is to provide an extension handle for automobile lug wrenchs which can be easily stored in the trunk compartment of an automobile.

BRIEF DESCRIPTION OF THE DRAWINGS

The above and other objects, advantages, and novel features of the present invention will become apparent from the following detailed description of a preferred embodiment of the invention illustrated in the accompanying drawings wherein:

FIG. 1 is a crossectional view of the extension handle along plane A A of FIG. 4.

FIG. 2 shows a typical L shaped automobile wheel lug nut wrench.

FIG. 3 is a perspective view of the extension handle.

FIG. 4 shows the handle attached to the wrench.

DESCRIPTION OF THE INVENTION

Referring now to the drawings and initially to FIG. 3 the device of the present invention is an extension handle designated by the reference numeral (1). It consists of a length of straight metal tube (1) having a bore of a size which can snugly accomodate the tapered end (7) of a standard automobile wheel lug nut wrench (3). There are two adjacent indentations (6) a short distance from one end. The bore is designated by the numeral (5). FIG. 2 shows a typical automobile wheel lug nut wrench (3) having a hexogonal socket (4), a handle (8), a tapered end (7) and the tip of the tapered end (9). FIG. 4 shows the extension handle (1) having a hand grip (2) at the other end, attached to the lug wrench (3) by insertion of the tapered end (7) of the wrench into the bore (5) of the handle (1) to form an integral unit. A sectional plane A—A is indicated through the tube comprising the handle (1), at the indentations (6). This plane is shown as a sectional view in FIG. 1 where the tip (9) of the lug wrench (3) is shown nested between the indentations (6) and the inside diameter of the tube or bore (5). This gripping nest structure forms an integral connection between the lug wrench (3) and extension handle (1) to limit the longitudinal insertion of the lug wrench (3) into the extension handle (1) and to prevent rotation of the lug wrench (3) relative to the extension handle (1). When the handle is attached to the wrench the effective leverage is about doubled that of the lug wrench alone.

Having thus described the invention and with full belief that the details of construction may be varied without departing from the spirit of the invention, what is claimed in Letters Patent is:

1. An automobile wheel lug nut wrench extension handle consisting of a length of straight round metal tube, having at a short distance from one end means for gripping a taper on one end of an automobile lug nut wrench, said gripping means forming a stop means for limiting the longitudinal insertion and rotation of said wrench relative to said handle, said gripping means comprising two adjacent indentations in said tube which forms in the bore of the tube bearing surfaces for securely engaging said taper of said lug nut wrench, said extension handle having on an end opposite the end on which the gripping means is disposed a hand grip for use in gripping and rotating said extension handle and lug wrench conjointly by an operator.

* * * * *